US010312496B2

(12) United States Patent
Bae et al.

(10) Patent No.: US 10,312,496 B2
(45) Date of Patent: Jun. 4, 2019

(54) RECHARGEABLE BATTERY HAVING A CURRENT DISTRIBUTION MEMBER

(71) Applicant: SAMSUNG SDI CO., LTD., Yongin-si, Gyeonggi-do (KR)

(72) Inventors: Sang-June Bae, Yongin-si (KR); Seok-Joon Yoon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 345 days.

(21) Appl. No.: 14/564,712

(22) Filed: Dec. 9, 2014

(65) Prior Publication Data

US 2015/0303439 A1 Oct. 22, 2015

(30) Foreign Application Priority Data

Apr. 17, 2014 (KR) .................. 10-2014-0046310

(51) Int. Cl.
*H01M 2/34* (2006.01)
*H01M 2/06* (2006.01)
(Continued)

(52) U.S. Cl.
CPC .............. *H01M 2/34* (2013.01); *H01M 2/06* (2013.01); *H01M 2/22* (2013.01); *H01M 2/26* (2013.01);
(Continued)

(58) Field of Classification Search
CPC ........ H01M 2/34; H01M 2/12; H01M 2/1223; H01M 2/04
See application file for complete search history.

(56) References Cited

U.S. PATENT DOCUMENTS 8,758,929 B2 6/2014 Byun et al.
2002/0150815 A1* 10/2002 Ehara .................. H01M 2/1061
429/90
(Continued)

FOREIGN PATENT DOCUMENTS

EP 2 515 363 A1 10/2012
EP 2 575 189 A1 4/2013
(Continued)

OTHER PUBLICATIONS

Extended European Search Report for 15158336.6 dated Jul. 9, 2015; Bae, et al.
(Continued)

*Primary Examiner* — Stewart A Fraser
*Assistant Examiner* — Rachel L Zhang
(74) *Attorney, Agent, or Firm* — Lee & Morse, P.C.

(57) ABSTRACT

A rechargeable battery including an electrode assembly including a first electrode and a second electrode; a case accommodating the electrode assembly; a cap assembly coupled with the case, the cap assembly including a terminal; a first current collecting member, the first current collecting member including a fuse portion connecting the terminal with the first electrode, and an electrode bonding portion fixed to the electrode assembly, the fuse portion having a lower melting point than other portions of the first current collecting member; and a current distribution member fixed to the first current collecting member, the current distribution member electrically connecting the first current collecting member with the case.

10 Claims, 15 Drawing Sheets

(51) Int. Cl.
  *H01M 2/22* (2006.01)
  *H01M 2/26* (2006.01)
  *H01M 10/04* (2006.01)
  *H01M 2/02* (2006.01)
  *H01M 2/04* (2006.01)

(52) U.S. Cl.
  CPC ........... *H01M 2/345* (2013.01); *H01M 2/348* (2013.01); *H01M 10/0413* (2013.01); *H01M 2/027* (2013.01); *H01M 2/0473* (2013.01); *H01M 2/0482* (2013.01); *H01M 2200/00* (2013.01); *H01M 2200/103* (2013.01); *H01M 2200/20* (2013.01); *H01M 2220/20* (2013.01)

(56) References Cited

U.S. PATENT DOCUMENTS

| | | | | |
|---|---|---|---|---|
| 2004/0067372 A1* | 4/2004 | Takei | ...................... | B32B 25/04 |
| | | | | 428/447 |
| 2004/0126651 A1* | 7/2004 | Kim | .................... | H01M 2/0257 |
| | | | | 429/61 |
| 2013/0084471 A1* | 4/2013 | Han | ...................... | H01M 2/043 |
| | | | | 429/7 |
| 2013/0122355 A1 | 5/2013 | Kim et al. | | |
| 2013/0288115 A1 | 10/2013 | Nidelkoff et al. | | |
| 2015/0079431 A1* | 3/2015 | Kim | ........................ | H01M 2/34 |
| | | | | 429/61 |
| 2015/0132619 A1* | 5/2015 | He | ........................ | H01M 2/043 |
| | | | | 429/53 |

FOREIGN PATENT DOCUMENTS

| | | |
|---|---|---|
| KR | 10-2012-0118315 A | 10/2012 |
| KR | 10-2013-0053026 A | 5/2013 |

OTHER PUBLICATIONS

Office Action dated May 31, 2017, of the corresponding European Patent Application No. 15158336.6.

European Office Action dated Apr. 4, 2018, of the corresponding European Patent Application No. 15158336.6.

\* cited by examiner

RECHARGEABLE BATTERY HAVING A CURRENT DISTRIBUTION MEMBER

CROSS-REFERENCE TO RELATED APPLICATION

Korean Patent Application No. 10-2014-0046310, filed on Apr. 17, 2014, in the Korean Intellectual Property Office, and entitled: "Rechargeable Battery Having Current Distribution Member," is incorporated by reference herein in its entirety.

BACKGROUND

1. Field

Embodiments relate to a rechargeable battery having a current distribution member.

2. Description of the Related Art

A rechargeable battery differs from a primary battery in that it can be repeatedly charged and discharged, while the latter is incapable of being recharged.

A low-capacity rechargeable battery may be used in small portable electronic devices, e.g., mobile phones, notebook computers, and camcorders, and a high-capacity rechargeable battery may be used as, e.g., a power source for driving a motor of hybrid vehicles or the like.

Recently, a high power rechargeable battery using a non-aqueous electrolyte and having high energy density has been considered, and the high power rechargeable battery may be configured such that a plurality of rechargeable batteries are connected in series for high power so as to be used as a power source for driving a motor of a device requiring a large amount of electric power, e.g., electric vehicles or the like.

In addition, a high-capacity rechargeable battery may include a plurality of rechargeable batteries connected in series, and the rechargeable battery may have a cylindrical shape, a prismatic shape, or the like.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery having a current distribution member.

The embodiments may be realized by providing a rechargeable battery including an electrode assembly including a first electrode and a second electrode; a case accommodating the electrode assembly; a cap assembly coupled with the case, the cap assembly including a terminal; a first current collecting member, the first current collecting member including a fuse portion connecting the terminal with the first electrode, and an electrode bonding portion fixed to the electrode assembly, the fuse portion having a lower melting point than other portions of the first current collecting member; and a current distribution member fixed to the first current collecting member, the current distribution member electrically connecting the first current collecting member with the case.

The cap assembly may include a cap plate coupled with the case, and a connecting member that electrically connects the terminal with the cap plate.

The connecting member may be coated with a resistive layer, the resistive layer being formed of a synthetic resin.

The rechargeable battery may further include a safety member that is electrically connected to the second electrode, the safety member being between the electrode assembly and the case.

The safety member may include a safety member side plate that faces a flat side surface of the electrode assembly, and a fixing tab that protrudes from the safety member side plate and that is attached to the electrode bonding portion, a surface of the safety member side plate that faces the electrode assembly including an insulating film thereon.

The current distribution member may be fixed to the first current collecting member at a connecting path that is between the fuse portion and the electrode assembly.

The current distribution member may include a current collecting member-fixing portion that is fixed to the first current collecting member, and a case fixing portion that is fixed to the case.

The first current collecting member may include a terminal bonding portion that is bonded to the terminal, and a current collecting member side plate that is bent from the terminal bonding portion and that connects the terminal bonding portion with the electrode bonding portion.

The fuse portion may be in the terminal bonding portion.

The current collecting member-fixing portion may be fixed to the current collecting member side plate.

The current collecting member-fixing portion may be fixed to the electrode bonding portion.

The case fixing portion may be fixed to a bottom of the case.

The case fixing portion may be fixed to a lateral side of the case, the lateral side extending between the cap assembly and a bottom of the case.

The current distribution member may include two current collecting member-fixing portions that are spaced apart from each other, and a lower portion of the current collecting member side plate may be in a supporting groove that is between the current collecting member-fixing portions.

The fuse portion may be enclosed by a heat conductive member.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
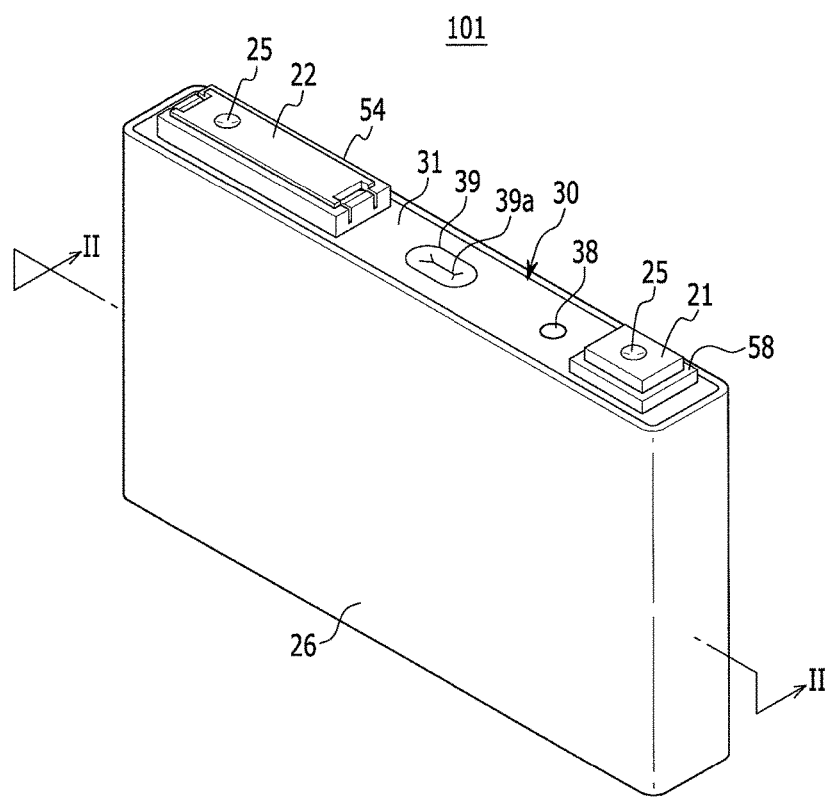
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
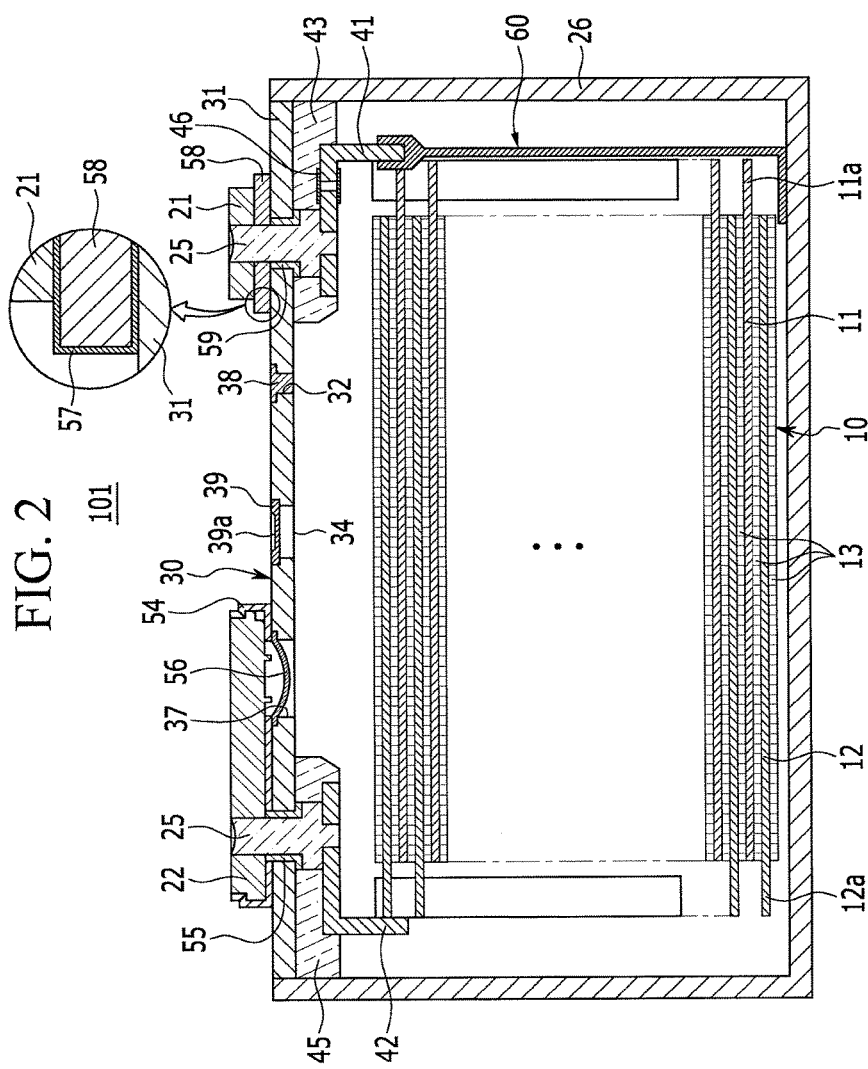
FIG. 2 illustrates a cross-sectional view of FIG. 1 taken along the line II-II.

FIG. 1 illustrates a perspective view of a rechargeable battery according to a first exemplary embodiment, and FIG. 2 illustrates a cross-sectional view of FIG. 1 taken along the line II-II.

Referring to FIGS. 1 and 2, the rechargeable battery 101 according to the first exemplary embodiment may include an electrode assembly 10 (formed by winding a positive electrode (a first electrode) 11 and a negative electrode (a second electrode) 12 with a separator 13 therebetween), a case 26 accommodating the electrode assembly 10, and a cap assembly 30 combined to or coupled with the case 26 at an opening in the case 26.

The rechargeable battery 101 according to the present exemplary embodiment is exemplarily illustrated as a prismatic-shaped lithium ion rechargeable battery.

However, the embodiments are not limited thereto, and it may be applied to various types of batteries such as a lithium polymer battery, a cylindrical battery, or the like.

The positive electrode 11 and the negative electrode 12 may include coated regions (where an active material is coated on a current collector formed of a thin metal foil), and uncoated regions 11a and 12a (where the active material is not coated thereon).

The positive electrode uncoated region 11a may be at one lateral end of the positive electrode 11 along a lengthwise direction thereof, and the negative electrode uncoated region 12a may be at another lateral end of the negative electrode 12 along a lengthwise direction thereof.

The positive electrode 11 and the negative electrode 12 may be wound while interposing the separator 13, which functions as an insulator, between them.

In an implementation, the electrode assembly 10 may be formed in a layered structure in which the negative electrode 12 and the positive electrode 11, respectively formed of a plurality of sheets, are layered while interposing the separator 13 between them.

A plurality of electrode assemblies 10 may be provided in the case 26, and, e.g., the number of electrode assemblies 10 disposed therein may a multiple of 2.

The case 26 may have a cuboid shape, and one side thereof may have an opening.

The case 26 may be formed of, e.g., a metal such as aluminum, stainless steel, or the like.

The cap assembly 30 may include a cap plate 31 (that covers the opening of the case 26), a first terminal 21 (that protrudes out of the cap plate 31 to be electrically connected to the positive electrode 11), and a second terminal 22 (that protrudes out of the cap plate 31 to be electrically connected to the negative electrode 12).

The cap plate 31 may have an elongated plate shape that is oblong in one direction and is coupleable with the opening of the case 26.

The cap plate 31 may include a sealing cap 38 that is inserted in an electrolyte injection opening 32, and a vent plate 39 that is provided in a vent hole 34 to be opened at a predetermined pressure and that includes a notch 39a.

The first and second terminals 21 and 22 may protrude above the cap plate 31.

The first terminal 21 may be electrically connected to the positive electrode 11 through a first current collecting member 41, and the second terminal 22 may be electrically connected to the negative electrode 12 through a second current collecting member 42.

In an implementation, the first terminal 21 may be electrically connected to the negative electrode, and the second terminal 22 may be electrically connected to the positive electrode.

The first terminal 21 may have a rectangular plate shape.

The first terminal 21 may be electrically connected to the positive electrode 11 through a connecting terminal 25 that is bonded to the first current collecting member 41.

The connecting terminals 25 that are respectively combined to or coupled with the first and second terminals 21 and 22 may have the same structure.

A sealing gasket 59 for sealing may be provided between the first terminal 21 and the cap plate 31 to be inserted into a hole through which the connecting terminal 25 penetrates, and a lower insulating member 43 may be provided under the cap plate 31 to support the first current collecting member 41.

A connection member 58 may be provided under the first terminal 21 to electrically connect the first terminal 21 with the cap plate 31.

In an implementation, the cap plate 31 and the case 26 may be positively charged.

Current may flow from the positive electrode 11 to the case 26 by way of the first current collecting member 41, the connecting terminal 25, the first terminal 21, and the cap plate 31.

A resistive layer 57 may be coated on a surface of the connection member 58. In an implementation, the resistive layer 57 may be formed of a synthetic resin, e.g., polytetrafluoroethylene (Teflon) or the like.

Once the resistive layer 57 is formed, resistance between the connection member 58 and the cap plate 31 may increase when a short-circuit current flows.

For example, a voltage applied to the first current collecting member 41, which is connected in series with the connection member 58, may decrease, and an excessive increase in temperature of the first current collecting member 41 may be reduced and/or prevented.

The second terminal 22 may have a rectangular plate shape.

The second terminal 22 may be electrically connected to the negative electrode 12 through the connecting terminal 25 that is bonded to or coupled with the second current collecting member 42.

The connecting terminal 25 may penetrate through the cap plate 31 and the second terminal 22 such that its upper portion is fixed to or coupled with the second terminal 22.

A sealing gasket 55 for sealing may be provided between the second terminal 22 and the cap plate 31 to be inserted into a hole through which the connecting terminal 25 penetrates, and a lower insulating member 45 may be provided under the cap plate 31 to insulate the second terminal 22 from the second current collecting member 42.

In an implementation, a short-circuit protrusion may be formed at a bottom of the second terminal 22 and may protrude toward a short-circuit hole 37.

The second terminal 22 may be elongated in one direction so as to cover the short-circuit hole 37.

An upper insulating member 54 may be between the second terminal 22 and the cap plate 31, e.g., for insulation.

The cap assembly 30 may include a short-circuit member 56 (for short-circuiting the positive electrode 11 with the negative electrode 12), the short-circuit member 56 may be electrically connected to the cap plate 31, and may be deformed to be connected to the second terminal 22 when the internal pressure of the rechargeable battery 101 increases.

The short-circuit hole 37 may be formed in the cap plate 31, and the short-circuit member 56 may be between the upper insulating member 54 and the cap plate 31 at the short-circuit hole 37.

The short-circuit member 56 may include a curved portion that is downwardly convex in an arc shape, and an edge portion that is formed at end portions of the curved portion to be fixed to the cap plate 31.

When a gas is generated due to an abnormal reaction in the rechargeable battery 101, the internal pressure of the rechargeable battery 101 may increase.

When the internal pressure of the rechargeable battery 101 exceeds a predetermined pressure, the curved portion is deformed to be upwardly convex, and in this case, the short-circuit protrusion and the short-circuit member 56 contact each other to cause a short-circuit.

Figure 3:
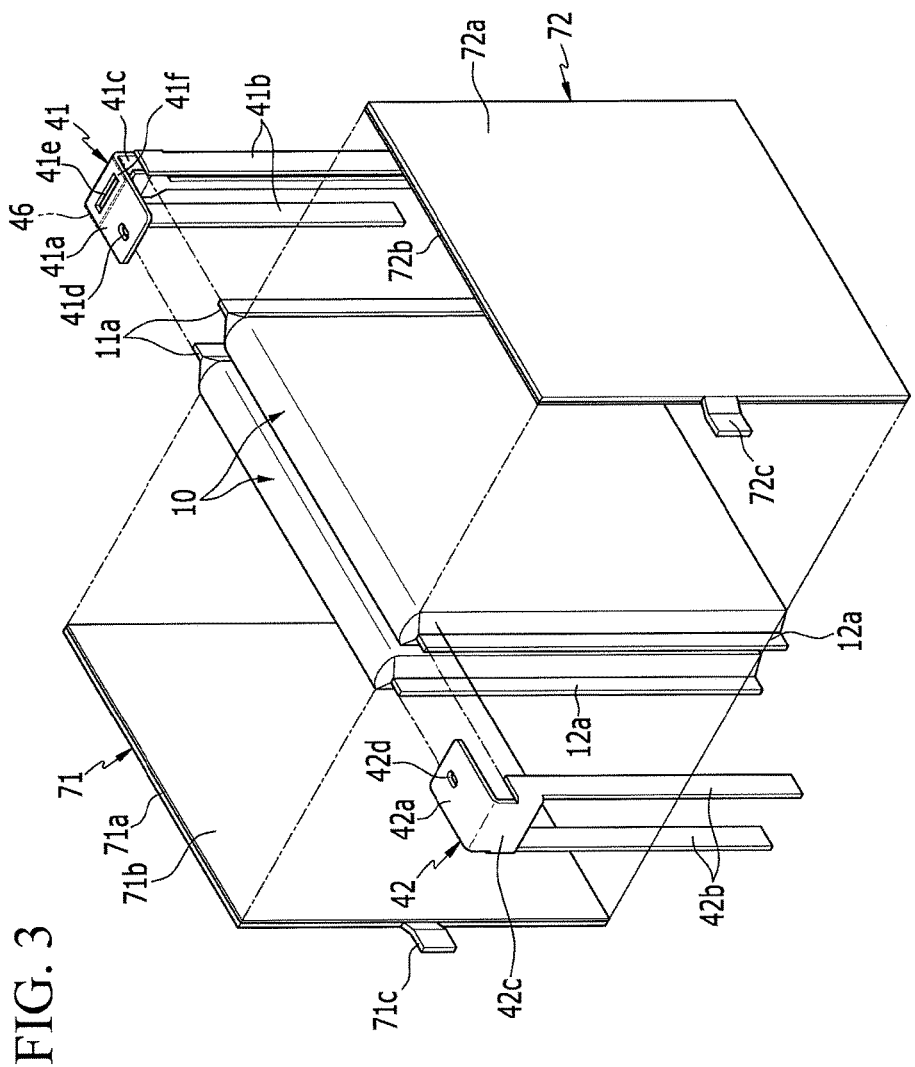
FIG. 3 illustrates an exploded perspective view of electrode assemblies and a current collecting member according to the first exemplary embodiment.
Figure 4:
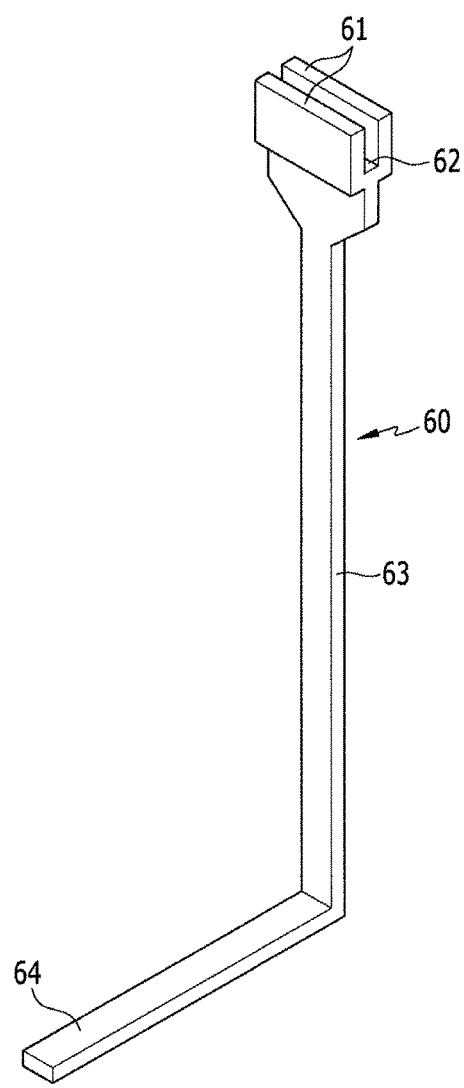
FIG. 4 illustrates a perspective view of a current distribution member according to the first exemplary embodiment.

FIG. 3 illustrates an exploded perspective view of electrode assemblies and a current collecting member according to the first exemplary embodiment, and FIG. 4 illustrates a perspective view of a current distribution member according to the first exemplary embodiment.

Referring to FIGS. 3 and 4, the first current collecting member 41 may include a terminal bonding portion 41a (that is bonded to the connecting terminal 25), a first current collecting member side plate 41c (that is bent toward a bottom of the case 26 from the terminal bonding portion 41a), and an electrode bonding portion 41b (that is elongated toward the bottom of the case 26 and extends from the first current collecting member side plate 41c).

The terminal bonding portion 41a may have a quadrangular plate shape, and may be fixed to the bottom of the connecting terminal 25 by, e.g., welding.

The terminal bonding portion 41a may include a coupling hole 41d, and the connecting terminal 25 and the terminal bonding portion 41a may be welded to each other after the protrusion of the connecting terminal 25 is fitted into the coupling hole 41d.

The first current collecting member side plate 41c may be bent at one end portion of the terminal bonding portion 41a, and may be parallel with lateral sides of the case 26.

The first current collecting member 41 may include, e.g., two electrode bonding portions 41b, and the electrode bonding portions 41b may be bonded to or coupled with the positive electrode uncoated region 11a and may be bent from the first current collecting member side plate 41c to be parallel with the positive electrode uncoated region 11a.

The electrode bonding portions 41b may be respectively bonded to or coupled with the positive electrode uncoated regions 11a of the different electrode assemblies 10 by, e.g., welding.

The terminal bonding portion 41a may include a fuse hole 41e, and lateral ends of the fuse hole 41e may include a fuse portion 41f having a smaller cross-sectional area than other adjacent portions thereof.

Having a lower melting point than the other portions, the fuse portion 41f may be melted earlier than the adjacent portions when an overcurrent flows due to, e.g., a short-circuit, thereby cutting off the current.

The fuse portion 41f may include a heat conductive member 46, and the heat conductive member 46 may be formed of a polymer having superior heat conductivity and high heat resistance. For example, the heat conductive member may have high heat conductivity and may not be susceptible to adverse effects of large amounts of heat.

For example, the heat conductive member 46 may be formed of a polyimide (PI), and the heat conductive member 46 may be formed by coating such that it may enclose the fuse portion 41f and the adjacent portions of the fuse portion 41f.

The second current collecting member 42 may include a terminal bonding portion 42a that is bonded to or coupled with the connecting terminal 25, a second current collecting member side plate 42c that is bent toward the bottom of the case 26 from the terminal bonding portion 42a, and an electrode bonding portion 42b that is elongated toward the bottom of the case 26 and extends from the second current collecting member side plate 42c.

The terminal bonding portion 42a has a quadrangular plate shape, and may be fixed to the bottom of the connecting terminal 25 by, e.g., welding.

The terminal bonding portion 42a may include a coupling hole 42d, and the connecting terminal 25 and the terminal bonding portion 42a may be welded to each other after the protrusion of the connecting terminal 25 is fitted into the coupling hole 42d.

The second current collecting member side plate 42c may be bent at one end portion of the terminal bonding portion 42a, and may be parallel with lateral sides of the case 26.

The second current collecting member 42 may include, e.g., two electrode bonding portions 42b, and the electrode bonding portions 42b may be bonded to or coupled with the negative electrode uncoated region 12a while being bent from the second current collecting member side plate 42c to be parallel with the negative electrode uncoated region 12a.

The electrode bonding portions 42b may be respectively bonded to or coupled with the negative electrode uncoated regions 12a of the different electrode assemblies 10 by, e.g., welding.

In an implementation, the first current collecting member 41 may be fixed to a current distribution member 60 that electrically connects the case 26 with the first current collecting member 41.

As shown in FIG. 4, the current distribution member 60 may include current collecting member-fixing portions 61 that are spaced apart from one another, a connecting portion 63 that downwardly extends toward the bottom of the case 26 from the current collecting member-fixing portions 61, and a case fixing portion 64 that is bent from the connecting portion 63 to be fixed to the bottom of the case 26.

Each current collecting member-fixing portion 61 may have a plate shape, and may include a supporting groove 62 between the current collecting member-fixing portions 61.

A lower end of the first current collecting member side plate 41c of the first current collecting member 41 may be inserted into the supporting groove 62, and the current collecting member-fixing portion 61 may be bonded to or coupled with the side plate 41c by, e.g., welding.

The current distribution member 60 may be fixed to the first current collecting member 41 in an electrical connection path between the fuse portion 41f and the electrode assembly 10. For example, the fuse portion 41f may be closer to the first terminal 21 than a bonded or fixed portion of the current distribution member 60 and the first current collecting member 41.

For example, the first current collecting member side plate 41c may be the portion where the current distribution member 60 and the first current collecting member 41 are bonded or fixed.

For example, the fuse portion 41f may be between the portion where the first terminal 21, the current distribution member 60, and the first current collecting member 41 are bonded.

The connecting portion 63 may have a bar shape, and may electrically connect the current collecting member-fixing portion 61 with the case fixing portion 64.

The case fixing portion 64 may be bent at the connecting portion 63, and may then be parallel with the bottom of the case 26 so as to be bonded thereto by, e.g., welding.

The current may flow from the positive electrode 11 to the case by way of the first current collecting member 41 and the current distribution member 60.

In the rechargeable battery 101 according to the present exemplary embodiment, the current may flow to the case through, e.g., two different paths. The two paths may include, e.g., a first path from the first current collecting member 41 to the case 26 by way of the connecting terminal 25, the first terminal 21, and the cap plate 31, and a second path from the first current collecting member 41 to the case 26 by way of the current distribution member 60.

When a first resistor (formed of a path from the first current collecting member 41 to the case 26 via the first terminal) has a first resistance, and a second resistor (formed of a path from the first current collecting member 41 to the case 26 via the current distribution member 60) has a second resistance, the first and second resistances may be equal to or only slightly different from each other.

For example, in order for the current to flow through both the path via the current distribution member 60 and the path via the first terminal 21, the resistances for the two paths may be equal to or similar to each other.

If the resistance of one path were to be much higher than that of the other path, the current may only flow through the path having a lower resistance, and may not flow through the other path, and the current may not be properly distributed.

It may be very difficult to make the resistances of the two paths exactly identical. Accordingly, a resistance difference may be in a predetermined range.

Even if the resistance of one path is smaller than the other, when the resistance difference is in the predetermined range, the resistance of one path may increase due to, e.g., a temperature increase as a result of a current flow, such that the resistances of the both paths may be equal to each other, thereby distributing the current through both paths.

For example, the resistance difference may be variously set according to an amount of the short-circuit current and resistivity of the current collecting member.

The resistance of the second path may be controlled by, e.g., varying a thickness and/or a length of the current distribution member 60.

The rechargeable battery 101 according to the present exemplary embodiment may further include a safety member on an external surface of the electrode assemblies 10, and the safety member may include a first safety member 71 at one exterior side of the stacked electrode assemblies 10, and a second safety member 72 at another exterior side of the electrode assemblies 10.

The first safety member 71 may be between one front or wide side surface of the case 26 and the electrode assembly 10, and the second safety member 72 may be between another front or wide side surface of the case 26 and the electrode assembly 10.

The first safety member 71 may contact an external surface of the electrode assembly 10.

The first safety member 71 may include a first safety member side plate 71a facing a flat, e.g., side, surface of the electrode assembly 10 that is directed toward or that faces the case, and a fixing tab 71c that protrudes from the first safety member side plate 71a and that is attached to the electrode bonding portion 42b.

In the present specification, the flat surface may refer to a smooth external circumferential surface of the electrode assembly 10, other than upper and lower curved portions thereof.

The first safety member side plate 71a and the fixing tab 71c may be formed of, e.g., a conductive metal plate such as copper, stainless steel, or the like.

An insulating film 71b may be attached to a surface of the first safety member side plate 71a that faces the electrode assembly 10.

The insulating film 71b may be formed of a polymer material, and may help prevent the first safety member side plate 71a from directly contacting the first electrode assembly 10.

The second safety member 72 may face the first safety member 71 with the electrode assemblies 10 therebetween.

The second safety member 72 may face the flat surface of the electrode assembly 10 that faces the case 26.

The second safety member 72 may include a second safety member side plate 72a attached to or facing the flat surface of the electrode assembly that faces outwardly from the electrode assembly 10, and a fixing tab 72c that protrudes from the second safety member side plate 72a and that is coupled with the electrode bonding portion 42b.

The second safety member side plate 72a and the fixing tab 72c may be formed of, e.g., a conductive metal plate such as copper, stainless steel, or the like.

An insulating film 72b may be attached to a surface of the second safety member side plate 72a that faces the electrode assembly 10.

The insulating film 72b may be formed of a polymer material, and may help prevent the second safety member side plate 72a from directly contacting the first electrode assembly 10.

Figure 5:
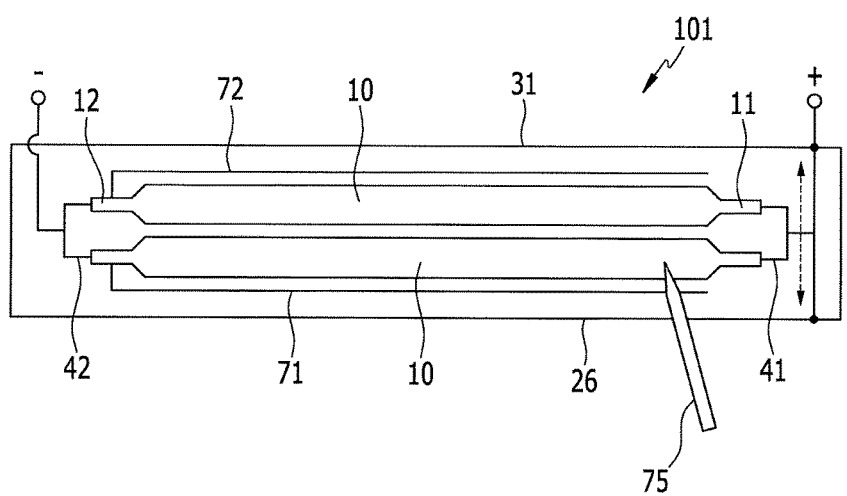
FIG. 5 illustrates a schematic diagram showing an electrical interconnection configuration of the rechargeable battery according to the first exemplary embodiment.

The first and second safety members 71 and 72 may be negatively charged and, as shown in FIG. 5, when a conductive foreign object 75 penetrates therethrough, the first safety member 71 or second safety member 72 may be electrically connected to the case 26 through the conductive foreign object 75.

In this case, the charged current in the electrode assembly 10 may flow to the case 26, and the current may flow from the first current collecting member 41 to the case via the first terminal 21 or via the current distribution member 60.

Without the current distribution member 60, the fuse portion 41f may be melted by overheating, e.g., due to overcurrent during the short circuit. Thus, when the conductive foreign object 75 penetrates, the current may not flow through the first current collecting member 41.

Accordingly, an excessive amount of heat may be generated inside the electrode assembly 10 because the short-circuit current may flow inside the electrode assembly 10.

When the connection member 58 is coated with the resistive layer 57 so as to help prevent the excessive amount of heat from being generated in the fuse portion 41f, the heat generated from the fuse portion may be decreased.

However, when only the resistive layer 57 is coated, energy dissipation of the fuse portion 41f may be too small and a large amount of heat may be generated in the electrode assembly 10.

However, as shown in the present exemplary embodiment, when the current is distributed to the current distribution member 60, the fuse portion 41f may be sustained until the short-circuit current is completely discharged, in addition to helping to prevent the large amount of heat from being generated in the electrode assembly 10 by dissipating it through the fuse portion 41f and the current distribution member 60.

Figure 6A:
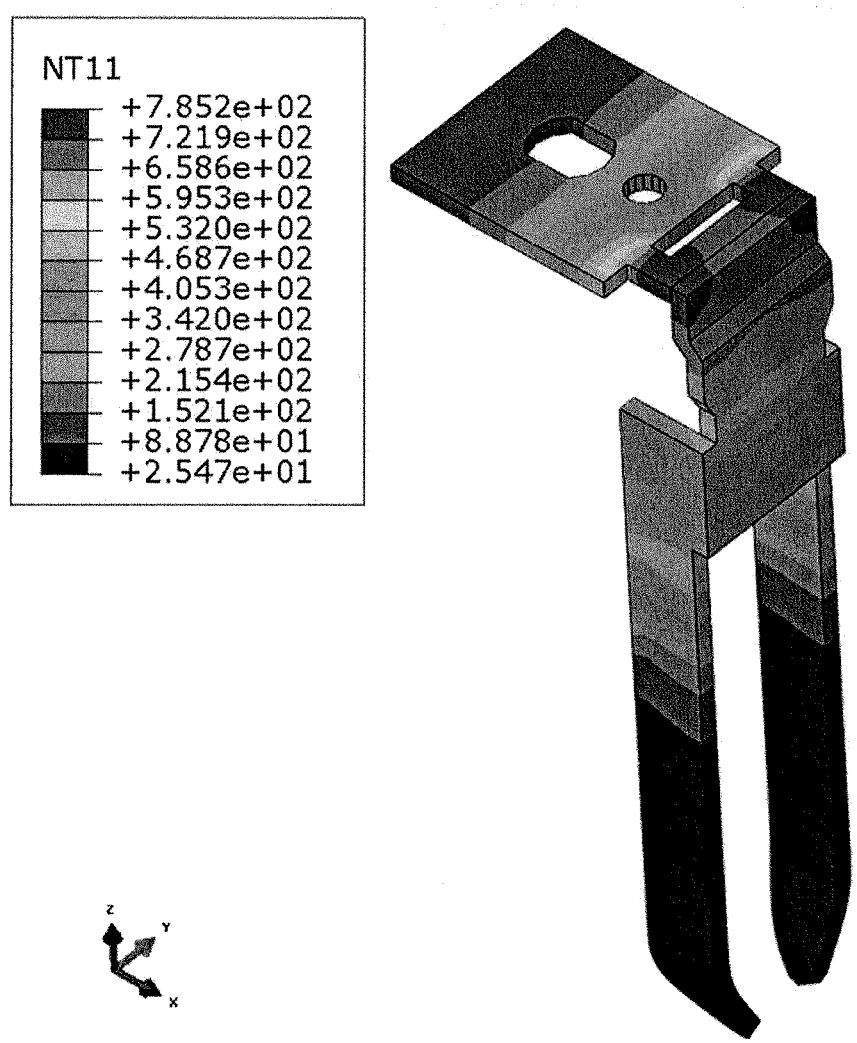
FIG. 6A illustrates a drawing showing temperature distribution of the current collecting member according to Comparative Example 1.
Figure 6B:
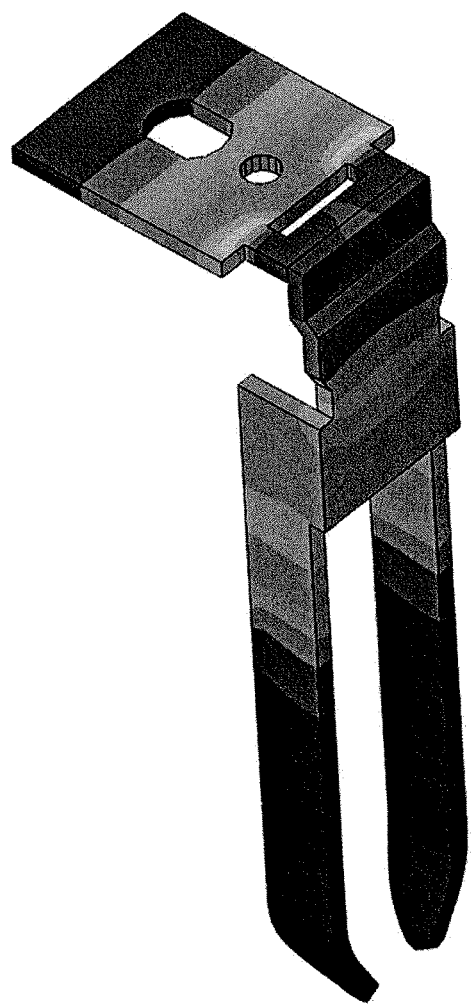
FIG. 6B illustrates a drawing showing temperature distribution of the current collecting member according to Comparative Example 2.
Figure 6C:
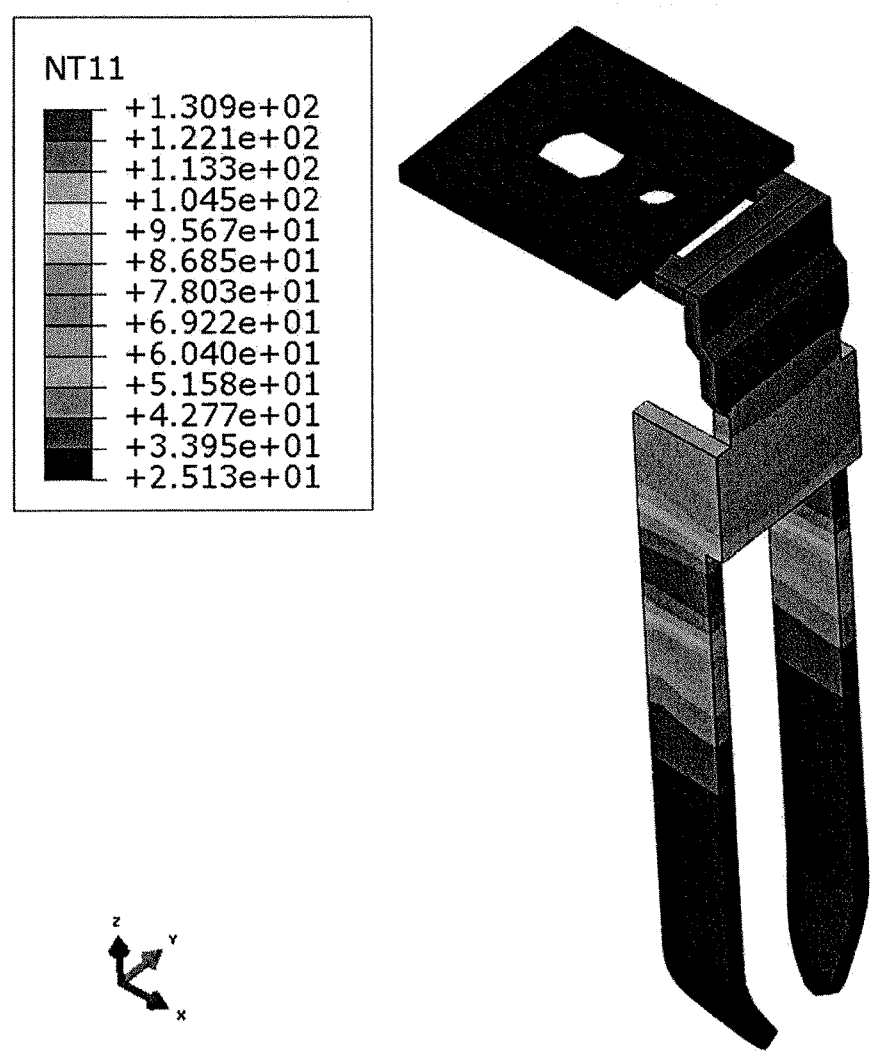
FIG. 6C illustrates a drawing showing temperature distribution of the current collecting member according to the first exemplary embodiment.

FIG. 6A illustrates a drawing showing temperature distribution of the current collecting member according to a Comparative Example 1, FIG. 6B illustrates a drawing showing temperature distribution of the current collecting member according to a Comparative Example 2, and FIG. 6C illustrates a drawing showing temperature distribution of the current collecting member according to the first exemplary embodiment.

Figure 7:
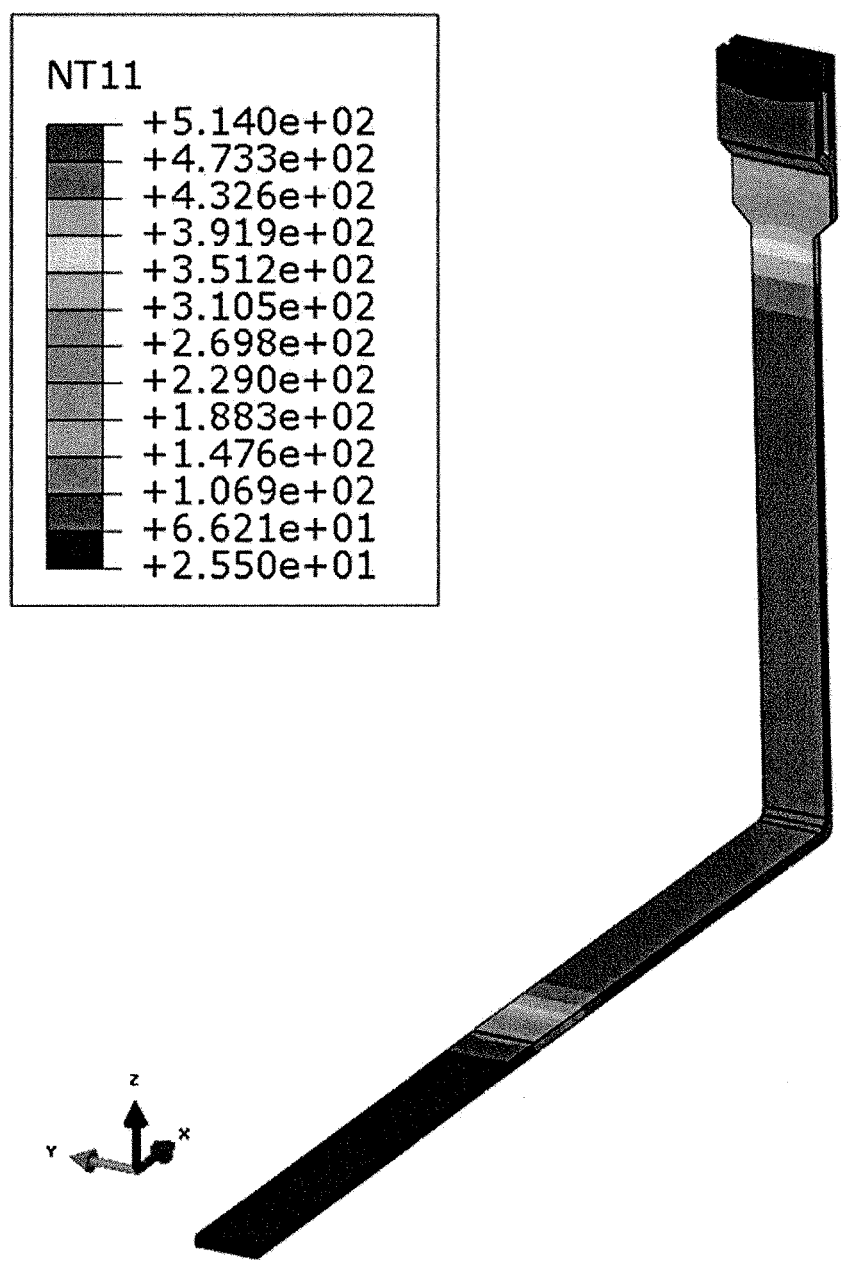
FIG. 7 illustrates a drawing showing temperature distribution of the current distribution member according to the first exemplary embodiment.

In addition, FIG. 7 illustrates a drawing showing temperature distribution of the current distribution member according to the first exemplary embodiment.

Referring to FIGS. 6A to 6C, the rechargeable battery of Comparative Example 1 (in which the connecting member was not formed with the resistive layer and was not provided with the current distribution member) and the rechargeable battery of Comparative Example 2 (in which the connection member was formed with the resistive member but was not provided with the current distribution member) were tested.

In addition, the rechargeable battery of the first exemplary embodiment was provided with the connection member including the resistive layer and the current distribution member.

As shown in FIG. 6A, it may be seen that the current collecting member of the rechargeable battery of Comparative Example 1 had a 700° C. portion that was higher than a melting point of aluminum (650° C.), and it may be seen that the current collecting member of the rechargeable battery of Comparative Example 2 had a maximum temperature of 50° C.

In contrast, it may be seen that the current collecting member of the rechargeable battery according to the present exemplary embodiment had a maximum temperature of 130° C.

It may be seen that the temperature of the current collecting member exceeded the melting point of aluminum in the case of Comparative Example 1, and the temperature of the current collecting member was very low in the case of Comparative Example 2.

In addition, it may be seen that the current collecting member of the present exemplary embodiment had a lower temperature than Comparative Example 1 and a higher temperature than Comparative Example 2.

Further, according to the present exemplary embodiment, as shown in FIG. 7, a large amount of the current flowed to the current distribution member 60, and the temperature of the current distribution member 60 increased up to 500° C.

However, the temperature of the current distribution member 60 was maintained lower than the melting point of aluminum.

As shown in the first exemplary embodiment, if an amount of heat discharged through the current distribution member 60 is increased, a voltage applied to the electrode assembly 10 may decrease with the same amount of current, thereby decreasing the amount of heat generated in the electrode assembly 10.

Figure 8:
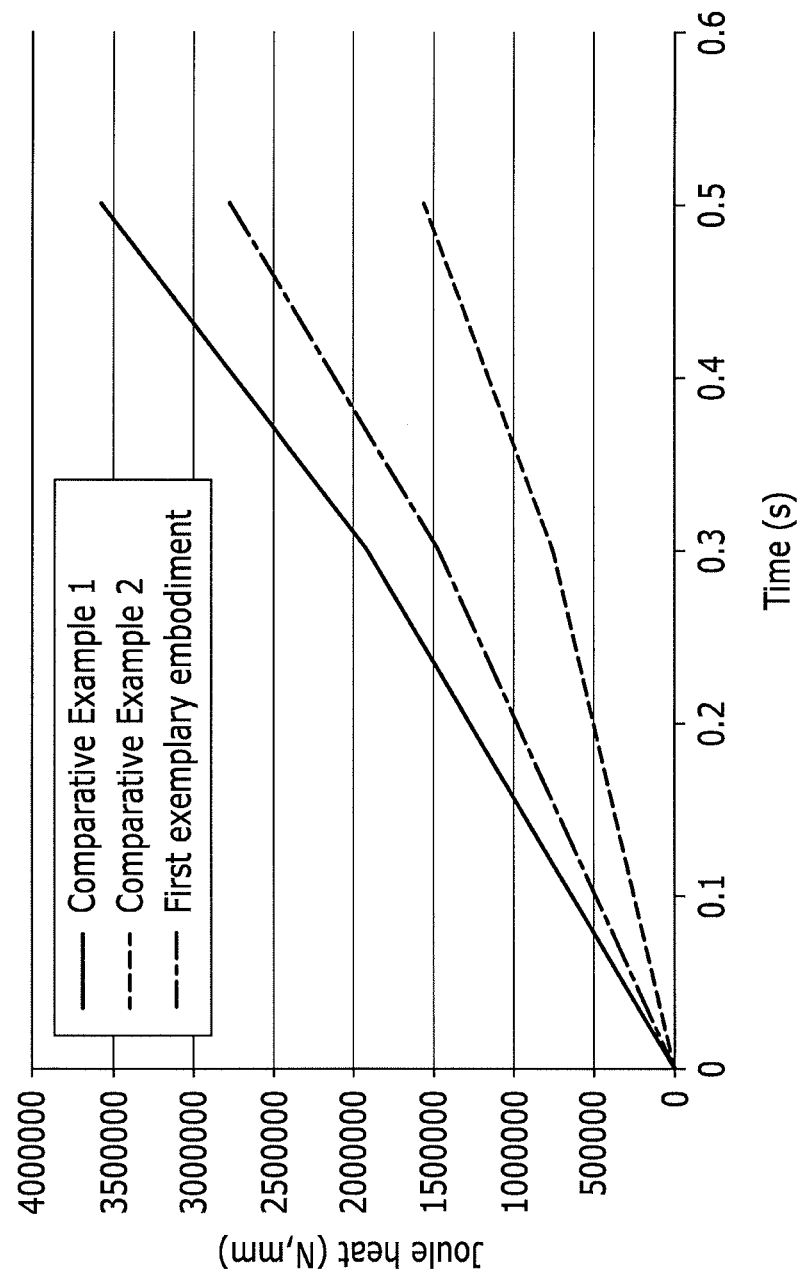
FIG. 8 illustrates a graph showing joule heat generated in the current collecting members according to passage of time.
Figure 9:
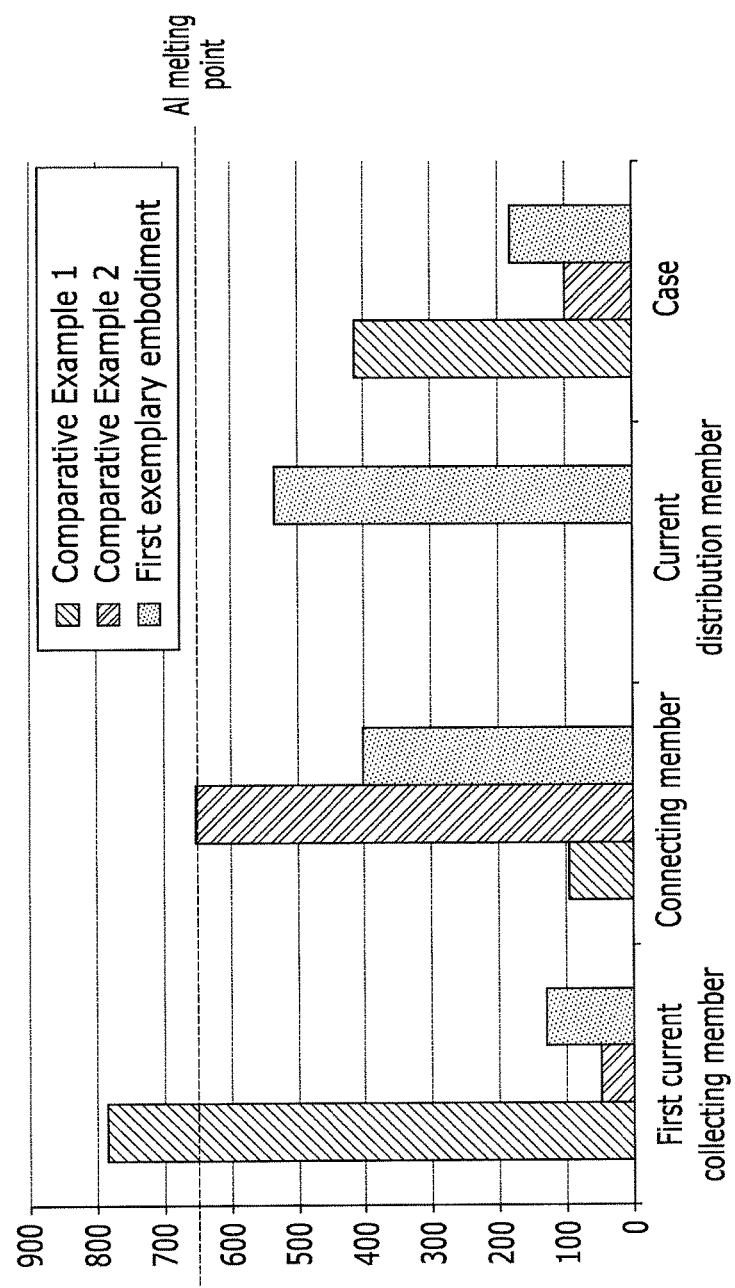
FIG. 9 illustrates a graph showing temperature distribution of parts of the rechargeable battery.

FIG. 8 illustrates a graph showing joule heat generated outside of the electrode assembly according to passage of time, and FIG. 9 illustrates a graph showing temperature distribution of rechargeable battery parts.

As shown in FIG. 8, it may be seen that a larger amount of joule heat was generated outside of the first current collecting member 41 of the first exemplary embodiment than that of Comparative Example 2.

A larger amount of joule heat was generated outside of the electrode assembly 10 of Comparative Example 1 than that of the first exemplary embodiment. But, as shown in FIG. 6A, the temperature of the first current collecting member 41 was higher than the melting point of aluminum (650° C.).

Further, as shown in FIG. 9, in the case of the first exemplary embodiment, the heat was distributed to the current collecting member 41 and the current distribution member 60, and the heat was stably discharged while temperatures of the parts were maintained below respective melting points.

Figure 10:
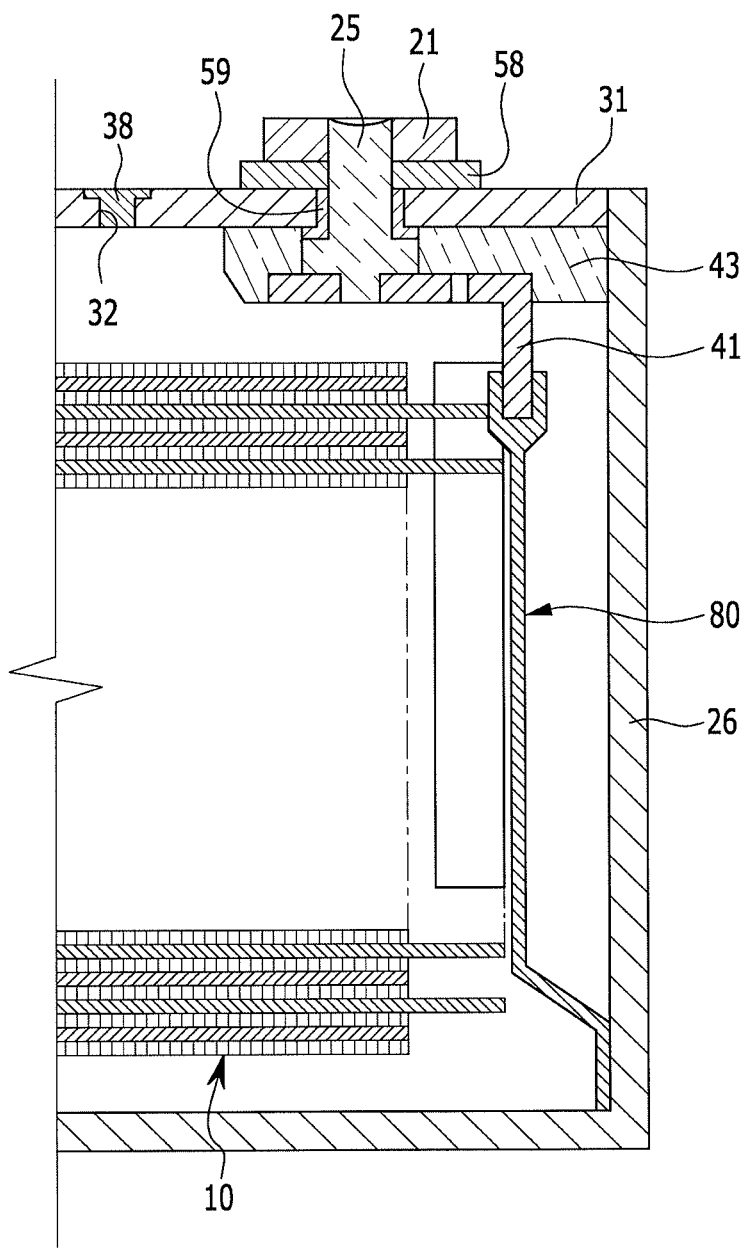
FIG. 10 illustrates a partial cross-sectional view of a rechargeable battery according to a second exemplary embodiment.
Figure 11:
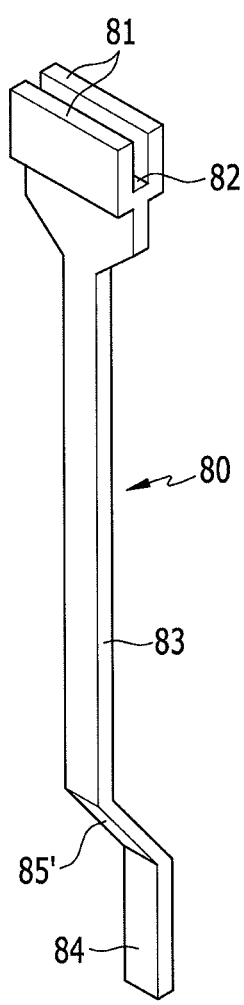
FIG. 11 illustrates a perspective view of a current distribution member according to the second exemplary embodiment.

FIG. 10 illustrates a partial cross-sectional view of a rechargeable battery according to a second exemplary embodiment, and FIG. 11 illustrates a perspective view of a current distribution member according to the second exemplary embodiment.

Referring to FIGS. 10 and 11, a rechargeable battery 102 according to the present exemplary embodiment may have the same general structure as the rechargeable battery according to the aforementioned first exemplary embodiment, except for a current distribution member 80, so a repeated description of the same structure may be omitted.

A current distribution member 80 may be fixedly provided on, e.g., fixed to, the first current collecting member 41 to electrically connect the case 26 and the first current collecting member 41.

The current distribution member 80 may include current collecting member-fixing portions 81 that are spaced apart from one another, a connecting portion 83 that downwardly extends toward the bottom of the case 26 from the current collecting member-fixing portions 81, an inclined portion 85' that is slantedly bent, e.g., bent at an inclined angle, from the connecting portion 83, and a case fixing portion 84 that is bent at the connecting portion 83 to be fixed to the bottom of the case 26.

Each current collecting member-fixing portion 81 may have a plate shape, the current distribution member 80 may have two current collecting member-fixing portions 81 that are spaced apart from each other, and the current collecting member-fixing portions 81 may include a supporting groove 82 therebetween.

A lower end of the first current collecting member side plate 41c of the first current collecting member 41 may be inserted in the supporting groove 82, and the current collecting member-fixing portion 81 may be bonded to or coupled with the first current collecting member side plate 41c by, e.g., welding.

The connecting portion 83 may have a bar shape, and may extend in a heightwise direction of the case 26.

The inclined portion 85 may be formed such that it is slantedly bent, with respect to a lengthwise direction of the connecting portion 83, from the connecting portion 83 toward a lateral side of the case 26.

Here, the lateral side of the case may refer to a side thereof that extends from the bottom of the case 26 and faces a lateral side end portion of the electrode assembly 10.

The case fixing portion 84 may be bent, e.g., slantedly bent, from the inclined portion 85, and may be bonded to a lateral side lower end of the case 26 by, e.g., welding, while being while being parallel with the lateral side of the case 26.

Figure 12:
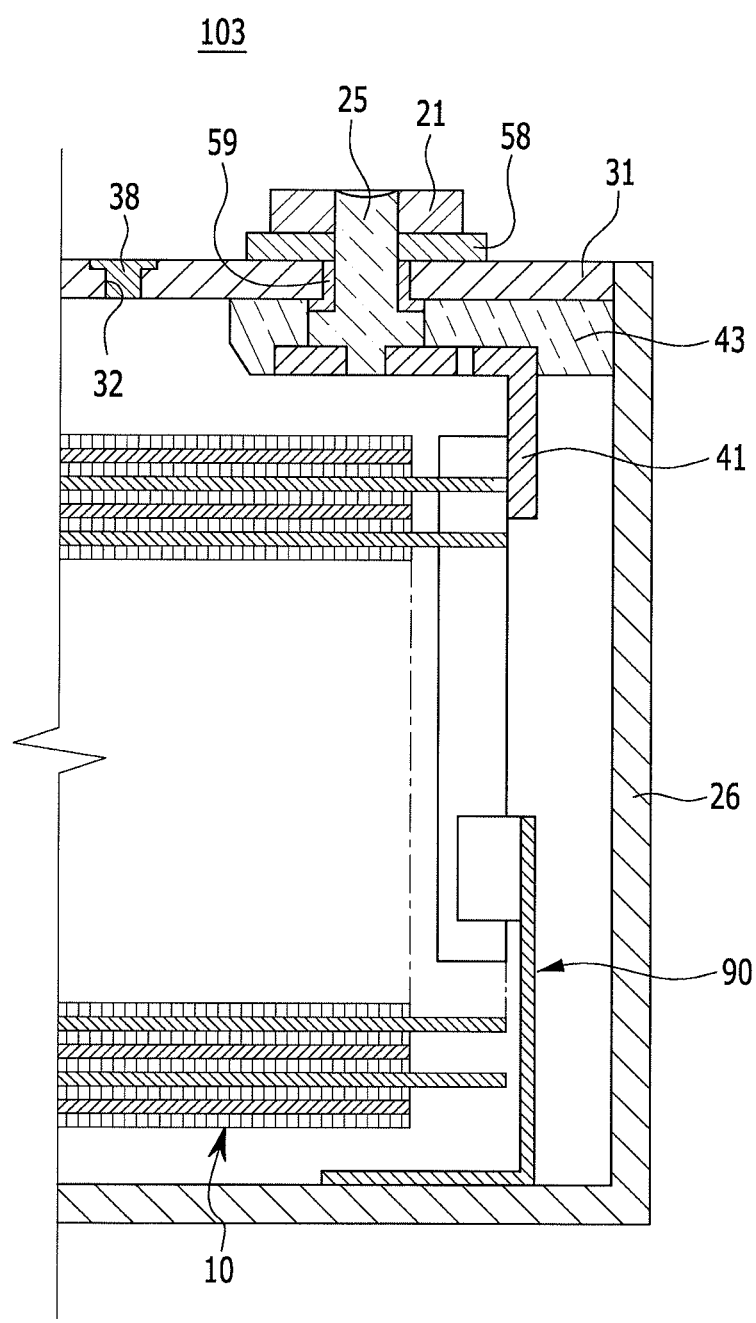
FIG. 12 illustrates a partial cross-sectional view of a rechargeable battery according to a third exemplary embodiment.
Figure 13:
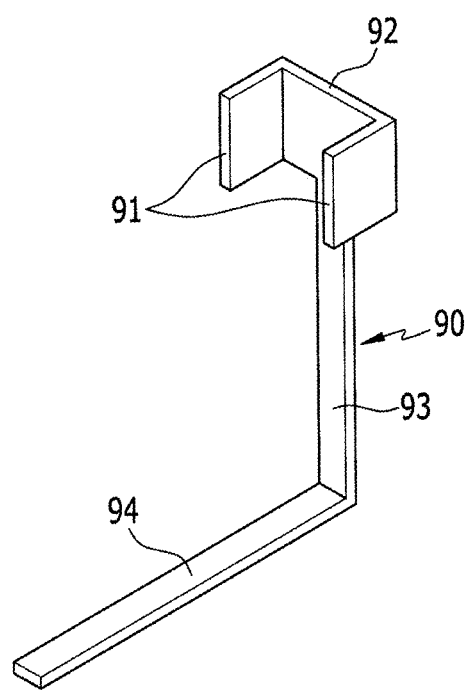
FIG. 13 illustrates a perspective view of a current distribution member according to the third exemplary embodiment.

FIG. 12 illustrates a partial cross-sectional view of a rechargeable battery according to a third exemplary embodiment of, and FIG. 13 illustrates a perspective view of a current distribution member according to the third exemplary embodiment.

Referring to FIGS. 12 and 13, the rechargeable battery 103 according to the present exemplary embodiment may have the same general structure as the rechargeable battery according to the aforementioned first exemplary embodiment, except for a current distribution member 90, so a repeated description of the same structure may be omitted.

The first current collecting member 41 may be fixedly provided with, e.g., fixed to, a current distribution member 90 that electrically connects the case 26 with the first current collecting member 41.

The current distribution member 90 may include current collecting member-fixing portions 91 that are spaced apart from one another, a connecting portion 93 that downwardly extends toward the bottom of the case 26 from the current collecting member-fixing portions 91, and a case fixing portion 94 that is bent from the connecting portion 93 an fixed to the bottom of the case 26.

Each current collecting member-fixing portion 91 may have a plate shape, and two current collecting member-fixing portions 91 may be spaced apart from one another to face each other.

The current collecting member-fixing portions 91 may include a supporting groove 92 therebetween, and a lateral side end portion of the electrode assemblies 10 may be inserted in the supporting groove 92.

The current collecting member-fixing portion 91 may be fixed to the first current collecting member 41 such that it is fixed to the electrode bonding portion 41b of the first current collecting member 41 by, e.g., welding.

The fuse portion 41f may be closer to the first terminal 21 than a bonded portion of the current distribution member 90 and the first current collecting member 41.

For example, the electrode bonding portion 41b may refer to the bonded portion of the current distribution member 90 and the first current collecting member 41.

The connecting portion 93 may have a bar shape, and may extend in a heightwise direction of the case 26.

The case fixing portion 94 may be bent from the connecting portion 93 and may be bonded to the bottom of the case 26 by, e.g., welding, while being parallel thereto.

By way of summation and review, if a short-circuit were to occur inside a rechargeable battery or external foreign objects were to cause a short-circuit, an overcurrent may flow in the rechargeable battery.

If the overcurrent continuously flows therein, excessive heat may be generated inside the rechargeable battery, thereby causing explosion or ignition of the rechargeable battery.

The embodiments may provide a rechargeable battery that can distribute a short-circuit current (and heat associated therewith) if an external short-circuit occurs.

According to an embodiment, the current distribution member may be provided to distribute an overcurrent (and heat associated therewith) generated when a short-circuit occurs.

Accordingly, in addition to helping to reduce the likelihood of and/or prevent the fuse portion from being overheated, the battery according to an embodiment may help prevent the electrode assembly from being overheated because heat discharging is induced through the current distribution member.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of Symbols>

101, 102, 103: rechargeable battery
10: electrode assembly
11: positive electrode
11a: positive electrode uncoated region
12: negative electrode
12a: negative uncoated region
13: separator
21: first terminal
22: second terminal
25: connecting terminal
26: case
30: cap assembly
31: cap plate
32: electrolyte injection opening
34: vent hole
37: short-circuit hole
38: sealing cap
39: vent plate
41: first current collecting member
42: second current collecting member <Description of Symbols>

41a, 42a: terminal bonding portion
41b, 42b: electrode bonding portion
41c, 42c: current collecting member side plate    41d, 42d: coupling hole
41e: fuse hole             41f: fuse portion
42: second current collecting member
43: lower insulating member
45: lower insulating member          54: upper insulating member
55: sealing gasket         56: short-circuit member
58: connecting member          59: sealing gasket
60, 80, 90: current distribution member
61, 81, 91: current collecting member-fixing portion
62, 82, 92: supporting groove        63, 83, 93: connecting portion
64, 84, 94: case fixing portion          71: first safety member
71a, 72a: safety member side plate       71b, 72b: insulating film
71c, 72c: fixing tab         72: second safety member
85: inclined portion

What is claimed is:

1. A rechargeable battery, comprising:
an electrode assembly consisting of a first electrode, a separator, and a second electrode;
a case accommodating the electrode assembly;
a cap assembly coupled with the case, the cap assembly including a terminal;
a first current collecting member, the first current collecting member including:
a fuse portion connecting the terminal with the first electrode, and
an electrode bonding portion fixed to the electrode assembly, the fuse portion having a lower melting point than other portions of the first current collecting member;
a current distribution member fixed to the first current collecting member, the current distribution member electrically connecting the first current collecting member with the case; and
a safety member that is electrically connected to the second electrode, the safety member being between the electrode assembly and the case,
wherein the current distribution member is fixed to the first current collecting member at a connecting path that is between the fuse portion and the electrode assembly such that the current distribution member forms a current path from the connecting path to the case,
wherein the cap assembly includes:
a cap plate coupled with the case, and
a connecting member that electrically connects the terminal with the cap plate, and
wherein the safety member includes a safety member side plate that faces a flat side surface of the electrode assembly, a surface of the safety member side plate that faces the electrode assembly including an insulating film thereon,
wherein the current distribution member includes:
a current collecting member-fixing portion that is fixed to the first current collecting member, and
a case fixing portion that is fixed to the case,
wherein the case fixing portion is fixed to a bottom inner side of the case such that the case fixing portion is electrically connected to the bottom inner side of the case,
wherein the bottom inner side of the case faces the electrode assembly, and
wherein the case fixing portion is directly adjacent to the electrode assembly.

2. The rechargeable battery of claim 1, wherein the connecting member is coated with a resistive layer, the resistive layer being formed of a synthetic resin.

3. The rechargeable battery as claimed in claim 1, wherein the safety member further includes:
a fixing tab that protrudes from the safety member side plate and that is attached to the electrode bonding portion.

4. The rechargeable battery as claimed in claim 1, wherein the first current collecting member includes:
a terminal bonding portion that is bonded to the terminal, and
a current collecting member side plate that is bent from the terminal bonding portion and that connects the terminal bonding portion with the electrode bonding portion.

5. The rechargeable battery as claimed in claim 4, wherein the fuse portion is in the terminal bonding portion.

6. The rechargeable battery as claimed in claim 5, wherein the current collecting member-fixing portion is fixed to the current collecting member side plate.

7. The rechargeable battery as claimed in claim 5, wherein the current collecting member-fixing portion is fixed to the electrode bonding portion.

8. The rechargeable battery as claimed in claim 5, wherein the case fixing portion is also fixed to a lateral side of the case, the lateral side extending between the cap assembly and a bottom of the case.

9. The rechargeable battery as claimed in claim 5, wherein:
the current distribution member includes two current collecting member-fixing portions that are spaced apart from each other, and
a lower portion of the current collecting member side plate is in a supporting groove that is between the current collecting member-fixing portions.

10. The rechargeable battery as claimed in claim 1, wherein the fuse portion is enclosed by a heat conductive member.

* * * * *